United States Patent
Jeong et al.

(10) Patent No.: US 8,422,560 B2
(45) Date of Patent: Apr. 16, 2013

(54) METHOD AND APPARATUS FOR ENCODING/DECODING MEDIA SIGNAL

(75) Inventors: Jong-hoon Jeong, Suwon-si (KR);
Geon-hyoung Lee, Hwaseong-si (KP);
Chul-woo Lee, Suwon-si (KR);
Nam-suk Lee, Suwon-si (KR); Han-gil Moon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1230 days.

(21) Appl. No.: 12/107,888

(22) Filed: Apr. 23, 2008

(65) Prior Publication Data

US 2009/0060024 A1   Mar. 5, 2009

(30) Foreign Application Priority Data

Aug. 31, 2007 (KR) .................. 10-2007-0088302

(51) Int. Cl.
*H04N 7/12* (2006.01)

(52) U.S. Cl.
USPC .................................... 375/240.18

(58) Field of Classification Search .............. 375/240.18
See application file for complete search history.

(56) References Cited

U.S. PATENT DOCUMENTS

| | | | | |
|---|---|---|---|---|
| 5,515,531 A * | 5/1996 | Fujiwara et al. | ...................... | 1/1 |
| 5,561,649 A * | 10/1996 | Lee et al. | .................... | 369/47.23 |
| 5,694,128 A * | 12/1997 | Kim | ................. | 341/79 |
| 5,701,300 A * | 12/1997 | Jeon et al. | ..................... | 370/392 |
| 5,740,171 A * | 4/1998 | Mazzola et al. | .............. | 370/392 |
| 5,778,102 A * | 7/1998 | Sandford et al. | .............. | 382/251 |
| 5,852,607 A * | 12/1998 | Chin | ............................. | 370/401 |
| 5,852,821 A * | 12/1998 | Chen et al. | ............................ | 1/1 |
| 5,870,747 A * | 2/1999 | Sundaresan | ............................ | 1/1 |
| 5,872,530 A * | 2/1999 | Domyo et al. | ................ | 341/106 |
| 5,978,812 A * | 11/1999 | Inokuchi et al. | ....................... | 1/1 |
| 6,008,745 A * | 12/1999 | Zandi et al. | ..................... | 341/67 |
| 6,065,050 A * | 5/2000 | DeMoney | ..................... | 709/219 |
| 6,147,629 A * | 11/2000 | Wood | ............................. | 341/67 |
| 6,169,983 B1 * | 1/2001 | Chaudhuri et al. | ................... | 1/1 |
| 7,493,442 B2 * | 2/2009 | Wong et al. | ................... | 711/103 |
| 2003/0051043 A1 * | 3/2003 | Wyschogrod et al. | ........ | 709/230 |

(Continued)

FOREIGN PATENT DOCUMENTS

KR    10-0519916 B1    9/2005

OTHER PUBLICATIONS

M. Bosi et al., "IS 13818-7 (MPEG-2 Advanced Audio Coding, AAC)", International Organization for Standardization, ISO/IEC JTC1/SC29/WG11 N1650, Apr. 1997.

*Primary Examiner* — Sath Perungavoor
*Assistant Examiner* — James Pontius
(74) *Attorney, Agent, or Firm* — Sughrue Mion, PLLC

(57) ABSTRACT

A method and apparatus for encoding/decoding a media signal. The method of decoding a media signal includes extracting first table index information from a header. The first table index information indicates M (M<N) tables substantially referred to by frames from among N tables which can be referred to for performing an operation performed by the frames, wherein N and M are natural numbers. Second table index information is then extracted from each frame. The second table index information indicates tables referred to by each frame from among M tables. The tables, which are referred to by the frames, are then identified by using the first and second table index information and the frames are decoded by referring to identified tables.

22 Claims, 5 Drawing Sheets

U.S. PATENT DOCUMENTS

| | | |
|---|---|---|
| 2005/0013369 A1 | 1/2005 | Lee |
| 2005/0047669 A1* | 3/2005 | Smeets et al. ................. 382/243 |
| 2006/0029367 A1* | 2/2006 | Kosugi et al. ................... 386/69 |
| 2006/0153464 A1 | 7/2006 | Song et al. |
| 2006/0209952 A1 | 9/2006 | Tanizawa et al. |
| 2007/0153918 A1* | 7/2007 | Rodriguez ............... 375/240.29 |
| 2008/0151903 A1* | 6/2008 | Wu et al. .................... 370/395.1 |
| 2009/0007208 A1* | 1/2009 | Kimura ......................... 725/114 |
| 2009/0037182 A1* | 2/2009 | Liebchen ...................... 704/500 |
| 2010/0195739 A1* | 8/2010 | Lu et al. .................. 375/240.25 |

* cited by examiner

METHOD AND APPARATUS FOR ENCODING/DECODING MEDIA SIGNAL

CROSS-REFERENCE TO RELATED PATENT APPLICATION

This application claims priority from Korean Patent Application No. 10-2007-0088302, filed on Aug. 31, 2007, in the Korean Intellectual Property Office, the disclosure of which is incorporated herein in its entirety by reference.

BACKGROUND OF THE INVENTION

1. Field of the Invention

The present invention relates to encoding and decoding a media signal, and more particularly, to a method and apparatus for encoding/decoding which enables data, used to determine a table which is referred to by frames of a media signal, to be reduced.

2. Description of the Related Art

When a media signal is transmitted, a compression technology is used to reduce a bandwidth of the signal or a bit rate. Apparatuses for encoding and decoding contain information relating to a table used by a media signal as a regulation set in advance between both apparatuses. A media signal uses a coefficient table to improve operation speed or uses an address table to transmit data to a designated address. The apparatuses for encoding and decoding prepare a plurality of operation tables so that one operator selects appropriate table among the plurality of operation tables and performs various functions using the selected table. In order to designate the table used in each frame, a predetermined bit is needed. For example, entropy coding, which performs data compression using statistical characteristics of a signal, generates models having various distributions of data. When statistical models of data increase, the number of tables also increases. When the number of tables increases, the amount of information to designate tables also increases.

FIG. 1 illustrates the number of bits needed to designate a table used in a media signal. Referring to FIG. 1, a media signal includes a header 101 and frames 103. An apparatus for encoding/decoding contains information relating to tables which can be referred to by the media signal in advance. It is assumed that the number of whole tables which can be referred to by the media signal is N. Each frame includes information for identifying the tables which are referred to so as to perform an operation. In order to identify one table from among N tables, $\log_2 N$ bits are needed. When the frame selects a table L times, the number of bits needed to designate the table by one frame is $(\log_2 N)*L$. When the number of frames is K, the number of bits needed to designate the table in K frames is $(\log_2 N)*L*K$. The larger the number of whole tables which can be referred to by a media signal, that is N, the more bits are needed to designate the table. When the number of the tables N which can be referred to by a media signal is reduced so as to reduce the number of bits needed to designate the table, various characteristics of the signal cannot be reflected, and thus an inefficient operation may be performed.

SUMMARY OF THE INVENTION

The present invention provides a method and apparatus for encoding a media signal which can improve a transmission rate of a media signal by reducing data needed to designate a table.

The present invention also provides a method and apparatus for encoding/decoding a media signal which can compress/restore a media signal using a small amount of information by reducing the data needed to designate a table.

An aspect of the invention is a method of encoding a media signal comprising a header and a plurality of frames, the method comprising: generating a first table index information indicating M tables from N tables, the M tables being substantially referred to by the frames for performing an operation performed by the frames, wherein M and N are natural numbers and M<N; inserting the first table index information into the header; generating a second table index information indicating tables referred to by each frame from among M tables; inserting the second table index information into each of the plurality of frames; and encoding the header and the frames.

The first table index information may include M, a number of tables which are referred to by the frames and table identification information for identifying the M tables. The first table index information may be expressed in $(\log_2 N)*M+M$ bits, wherein $(\log_2 N)*M$ is a number of bits used to identify M tables from among N tables and M is a number of bits for indicating the number of table M which are referred to by the frames. The second table index information may be expressed as a multiplication of the number of bits for identifying M tables and a frequency in which the tables are referred to by each frame. The table may include at least one of a table used in entropy coding for data compression, an exponential function table, a log function table, and a trigonometric function table for reducing one of complexity and workload of an operation, a coefficient table for filtering data, Fast Fourier Transform (FFT), Discrete Cosine Transform (DCT), Discrete Fourier Transform (DFT), and Wavelet tables for spatial movement, and SWAP and Direct Memory Access (DMA) for replacing, copying, and moving data. The generating of the first table index information may further include identifying the tables that are substantially referred to by the frames and using information relating to the tables that are substantially referred to by the frames.

According to another aspect of the present invention, there is provided a method of decoding a media signal comprising a header and a plurality of frames, the method including: extracting a first table index information from the header, the first table index information indicating M tables from among N tables, the M tables being substantially referred to by the frames for performing an operation performed by the frames, wherein M and N are natural numbers and M<N; extracting a second table index information from each frame, the second table index information indicating tables referred to by each frame from among the M tables; identifying the tables referred to by the frames by using the first and second table index information; and decoding the frames by referring to the identified tables.

According to another aspect of the present invention, there is provided an apparatus for encoding a media signal comprising a header and a plurality of frames, the apparatus including: a first table index information generating unit which generates first table index information indicating M tables from N tables, the M tables being substantially referred to by the frames for performing an operation performed by the frames, wherein M and N are natural numbers and M<N; a second table index information generating unit which generates second table index information indicating tables referred to by each frame from among the M tables; and a table index information inserting unit which inserts the first table index information into the header and the second table index information into each of the plurality of frames.

According to another aspect of the present invention, there is provided an apparatus for decoding a media signal comprising a header and a plurality of frames, the apparatus including: a first table index information extracting unit which extracts first table index information from the header, the first table index information indicating M tables from N tables, the M tables being substantially referred to by the frames for performing an operation performed by the frames, wherein M and N are natural numbers and M<N; a second table index information extracting unit which extracts second table index information from each frame, the second table index information indicating tables referred to by each frame from among the M tables; a table identifying unit which identifies the tables referred to by the tables by using the first and second table index information; and a decoding unit which decodes the frames by referring to the identified tables.

BRIEF DESCRIPTION OF THE DRAWINGS

The above and other features and advantages of the present invention will become more apparent by describing in detail an exemplary embodiments thereof with reference to the attached drawings in which.

DETAILED DESCRIPTION OF THE EXEMPLARY EMBODIMENTS

Hereinafter, the present invention will be described more fully with reference to the accompanying drawings, in which exemplary embodiments of the invention are shown.

Figure 1:
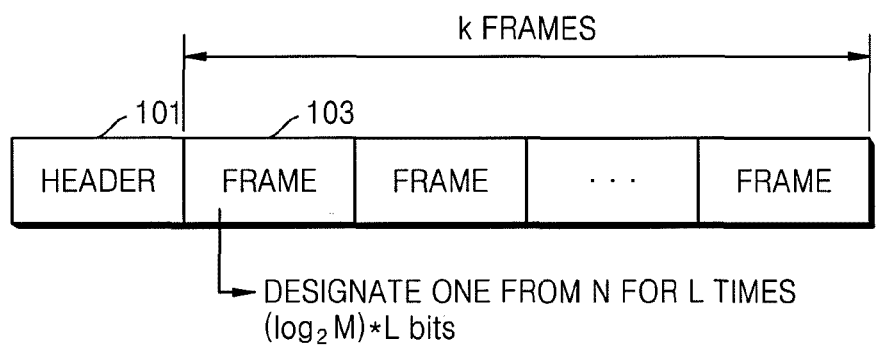
FIG. 1 illustrates the number of bits needed to designate an exemplary table used by a media signal.
Figure 2:
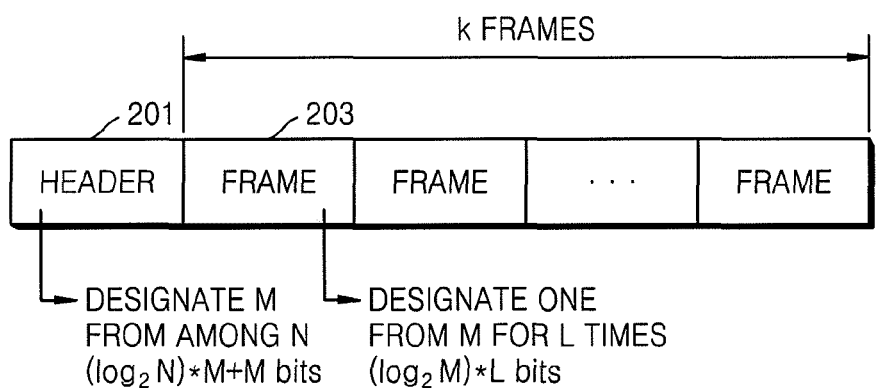
FIG. 2 illustrates a data structure of a media signal for explaining data needed to designate a table, according to an exemplary embodiment of the present invention.

FIG. 2 illustrates a data structure of a media signal for explaining data needed to designate a table, according to an exemplary embodiment of the present invention. Referring to FIG. 2, a media signal according to an exemplary embodiment of the present invention includes a header 201 and a plurality of frames 203. The header 201 includes information to decode the frames after the header 201. The frames refer to a table that is used to perform an operation. The tables which can be referred by the frames include a Huffman table and a binary tree table used in entropy coding for data compression, a probability table for operation coding, and various other tables for reducing complexity or workload of operation, for example, trigonometric function, log function, or exponential function tables. In addition, the frames can perform various operations by referring to a coefficient table for filtering data, tables such as Fast Fourier Transform (FFT), Discrete Cosine Transform (DCT), Discrete Fourier Transform (DFT), and Wavelet for performing transformations for spatial movement, and SWAP and Direct Memory Access (DMA) for replacing, copying, and moving data.

When it is assumed that the total number of tables which can be referred to by the frames included in the media signal is N (N is a natural number), an apparatus for encoding and decoding (not illustrated) includes information relating to N tables according to a regulation set in advance. In most cases, the frames of the media signal refer to only a few tables from among previous prepared tables. Therefore, an apparatus for encoding a media signal extracts information relating to the tables which the frames substantially refer to and inserts the information into the header 201. When it is assumed that the number of tables substantially used by K frames which are after the specific header 201 is M (M<N, M is a natural number) in FIG. 2, the apparatus for encoding a media signal generates information which indicates what the M tables used by the frames are (hereinafter, referred to as first table index information) and inserts the generated first table index information into the header 201. The first table index information includes table identifying information and the number of table types substantially used by the frames. The table identifying information expresses the information indicating what the M tables that are substantially referred to by the frames from among a total of N tables are, by using $(\log_2 N)*M$ bits. In addition, the first table index information includes information indicating that the number of tables referred to by the frames is M and the information can be expressed by using M bits. Therefore, the first table index information included in the header 201 can be expressed by using $(\log_2 N)*M+M$ bits. The encoding apparatus generates information indicating what the table referred to by the specific frame 203 from among the tables substantially referred to by the frames is and inserts the information into the specific frame. In FIG. 2, since the K frames connected after the header 201 only use M tables from among N tables, the encoding apparatus inserts the information indicating the tables referred to by each frame from among M tables (hereinafter, referred to as second table index information) into each frame. Since the second table index information is for identifying what the specific table used in each frame is from among M tables, when each frame refers to the table once, the second table index information can be expressed as the number of bits of $\log_2 M$. When each frame refers to the tables L times (L is a natural number), the second table index information becomes $(\log_2 M)*L$. In FIG. 2, since the number of the frames connected behind one header 201 is K, the number of bits needed to designate the table in K frames is $(\log_2 M)*L*K$. The apparatus for encoding a media signal inserts the generated first table index information and second table index information into each header 201 and the frames 203 and encodes the media signal including the header 201 and the frames 203, thereby transmitting the encoded signal to a decoding apparatus (not illustrated).

Figure 3:
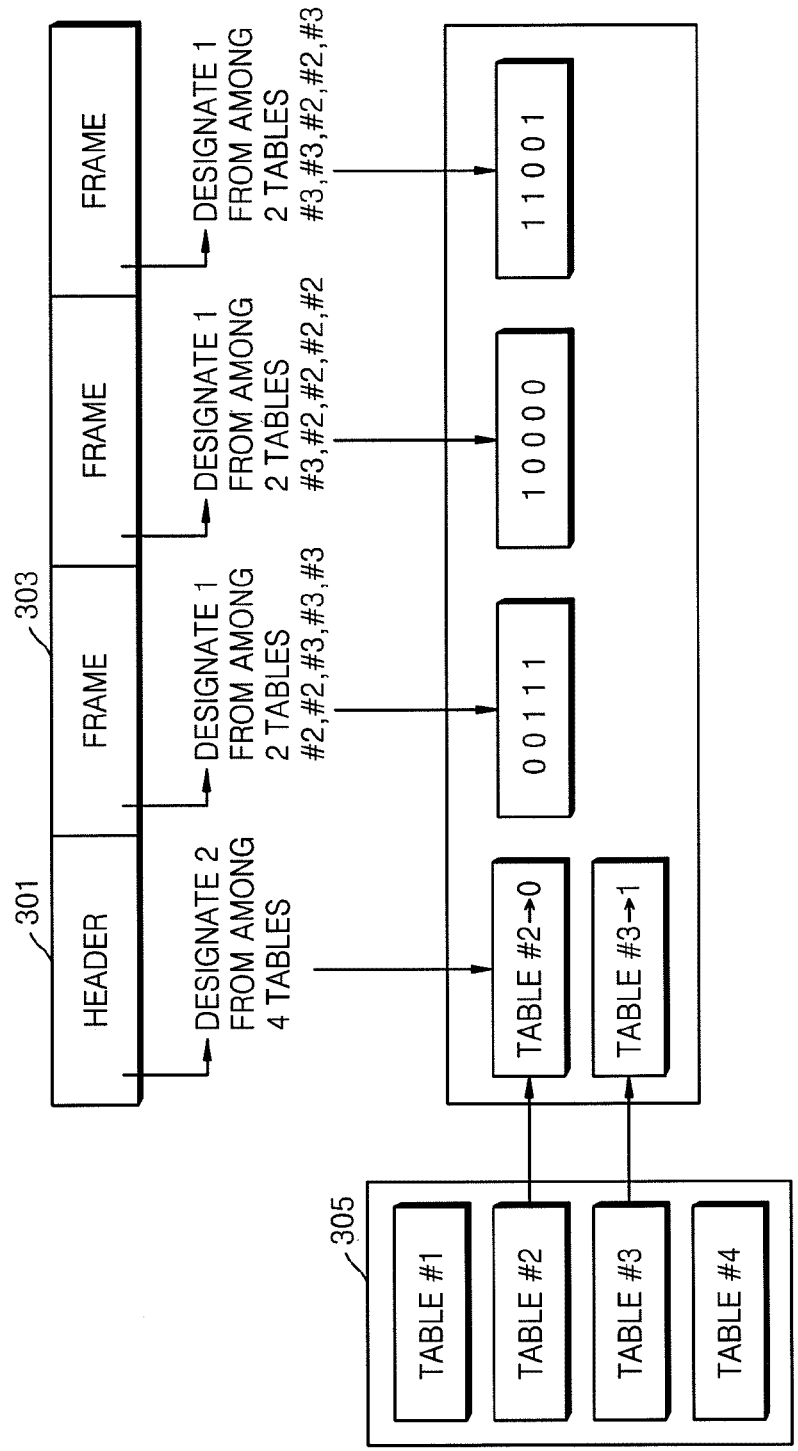
FIG. 3 is a diagram for explaining a reduction in the number of bits needed to designate a table according to an exemplary embodiment of the present invention.

FIG. 3 is a diagram for explaining reduction in the number of bits needed to designate a table according to an exemplary embodiment of the present invention. Referring to FIG. 3, the media signal includes a header 301 and a plurality of frames 303. It is assumed that the total number of tables 305 which can be referred to by the media signal is 4 according to a preliminary agreement between an encoding apparatus (not illustrated) and a decoding apparatus (not illustrated) in FIG. 3. According to the conventional art, the media signal should select the table referred to by the media signal from among four tables 305 and thus $\log_2 4$ bits are needed to select one table. In FIG. 3, when each frame selects tables five times, $\log_2 4*5$ bits are needed to select the table by each frame and when the number of the frames is 3, the total bits needed to designate the table in the media signal in FIG. 3 is 30 according to $\log_2 4*5*3$.

According to the present invention, the encoding apparatus identifies the tables substantially referred to by the frames connected behind the header 301. In FIG. 3, each frame only refers to table 2 (illustrated as #2) and table 3 (illustrated as #3) from among four tables 305. The encoding apparatus extracts information for identifying the tables 2 and 3 which are substantially referred to by the frames from among four tables 305 which can be referred to by the media signal. In order to identify the table 2 and table 3 from among four tables, the encoding apparatus extracts information for identifying the table 2 and table 3 and inserts the information into the header 201. 2 bits are needed to identify one table from among four tables and bits multiplied by 2 are needed to identify two tables. The encoding apparatus includes information indicating the number of table types substantially referred to by each frame to the header 301 and transmits the information to the decoding apparatus. In this case, the decoding apparatus can identify the number of table types which are substantially used by the frames connected behind the header 301. The encoding apparatus may express the table types substantially referred to by each frame by using bits. In FIG. 3, each frame only refers to two tables from among four tables so that it can be expressed in 2 bits. The encoding apparatus generates the first table index information using 2 bits for indicating that the table types substantially referred to by the frames are two and $(\log_2 4)*2$ bits for indicating that the tables referred to are table 2 and table 3 from among four tables and inserts the generated first table index information into the header 301. That is, the first table index information inserted into the header 301 becomes $2+(\log_2 4)*2=6$.

The encoding apparatus generates the second table index information indicating the tables referred to by each frame from among two types of the tables that are substantially referred to by the plurality of frames of the header 301. In FIG. 3, each frame connected after the header 301 selects a table five times. The encoding apparatus expresses information for identifying the table 2 and table 3 that are substantially referred to by the frames as 1 bit and expresses the table 2 and the table 3 as 0 and 1, respectively. Since the first frame 303 designates the tables 2, 2, 3, 3, and 3 (illustrated as #2, #2, #3, #3, and #3), the encoding apparatus can express the tables referred to by the first frame 303 in 5 bits with identifying information 0 or 1, such as 00111. The encoding apparatus generates the second table index information by using 5 bits and inserts the generated second table index information into the first frame 303. The encoding apparatus generates the second table index information with respect to the second and third frames using the same method and inserts the information into each frame. The second table index information is for identifying one table from among two tables extracted by the header 301 so that $\log_2 2$ bits are needed. In FIG. 3, since each frame refers to the tables five times, the number of bits needed to designate the tables by one frame is $(\log_2 2)*5$ and since three frames are followed by the header 301, the number of bits needed to designate the tables from among whole frames of the media signal is $(\log_2 2)*5*3$. The encoding apparatus generates the first table index information and the second table index information and inserts the information into the header 301 and the plurality of frames 303. Here, the number of bits needed to designate the tables from one media signal is $[2+(\log_2 4)*2]+[(\log_2 2)*5*3]=21$. When compared with the conventional art, the number of bits needed in designating the table is reduced by 30% in the present invention.

Figure 4:
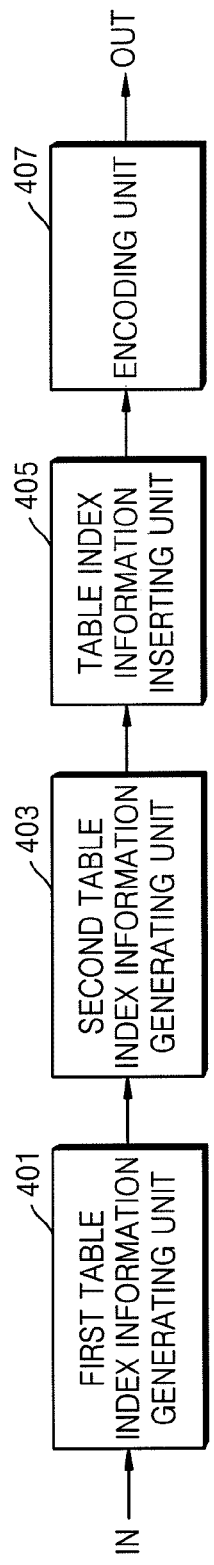
FIG. 4 is a block diagram of an apparatus for encoding a media signal according to an exemplary embodiment of the present invention.

FIG. 4 is a block diagram of an apparatus for encoding a media signal according to an exemplary embodiment of the present invention. Referring to FIG. 4, the apparatus for encoding a media signal includes a first table index information generating unit 401, a second table index information generating unit 403, a table index information inserting unit 405, and an encoding unit 407. The first table index information generating unit 401 generates the first table index information indicating M tables that are substantially referred to by the frames from among N tables. As described above, the first table index information is for indicating information for identifying M tables from among N tables and the number of tables M that is substantially used by the frames from among N tables. The first table index information generating unit 401 is expressed by the sum of M bits for indicating the number of tables that are substantially used by the frames and $(\log_2 N)*M$ bits for identifying M tables from among N tables. The second table index information generating unit 403 generates the second table index information indicating the tables that are referred to by each frame from among M tables. The second table index information identifies the tables from among M tables, instead of N, so as to be indicated as $\log_2 M$ bits and $\log_2 M*L$ bits, when each frame refers to the table L times. The table index information inserting unit 405 inserts the first table index information generated by the first table index information generating unit 401 into the header of the media signal and the second table index information generated by the second table index information generating unit 403 into each frame of the media signal. The encoding unit 407 encodes the media signal to which the first and second table index information is inserted.

Figure 5:
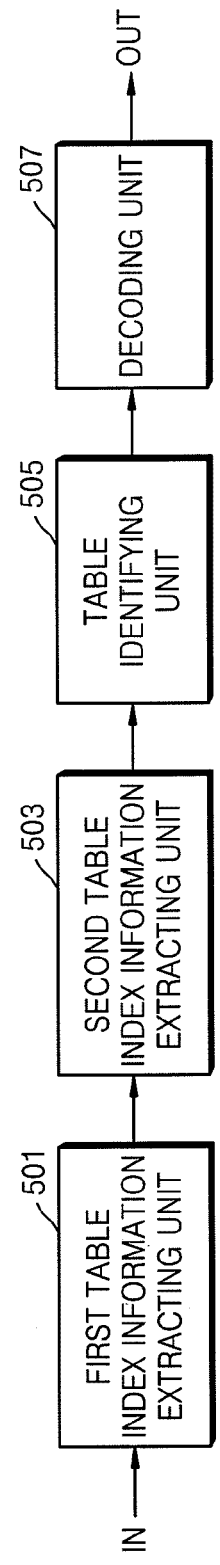
FIG. 5 is a block diagram of an apparatus for decoding a media signal according to an exemplary embodiment of the present invention.

FIG. 5 is a block diagram of an apparatus for decoding a media signal according to an exemplary embodiment of the present invention. Referring to FIG. 5, the apparatus for decoding a media signal includes a first table index information extracting unit 501, a second table index information extracting unit 503, a table identifying unit 505, and a decoding unit 507. The first table index information extracting unit 501 extracts the first table index information from the header of the media signal. The first table index information includes the number of tables used by the frames of the media signal from among N tables and identifiers indicating the tables. The first table index information extracting unit 501 sends extracted first table index information to the table identifying unit 505. The second table index information extracting unit 503 extracts the second table index information from each frame of the media signal and sends the extracted second table index information to the table identifying unit 505. The table identifying unit 505 identifies the tables referred to by each frame by using the first and second table index information. The table identifying unit 505 obtains $\log_2 M$ bits by using the number of tables included in the first table index information, M. The table identifying unit 505 can identify how many times the tables are referred to by each frame by using the fact that the second table index information is expressed in a multiplication of $\log_2 M$ and the frequency in which each frame refers to the tables. In addition, since $\log_2 M$ bits is information to indicate the tables used in each frame from among M tables, the table identifying unit 505 can identify the tables referred to by each frame using $\log_2 M$ bits. The decoding unit 507 decodes each frame by referring to the tables identified by the table identifying unit 505.

Figure 6:
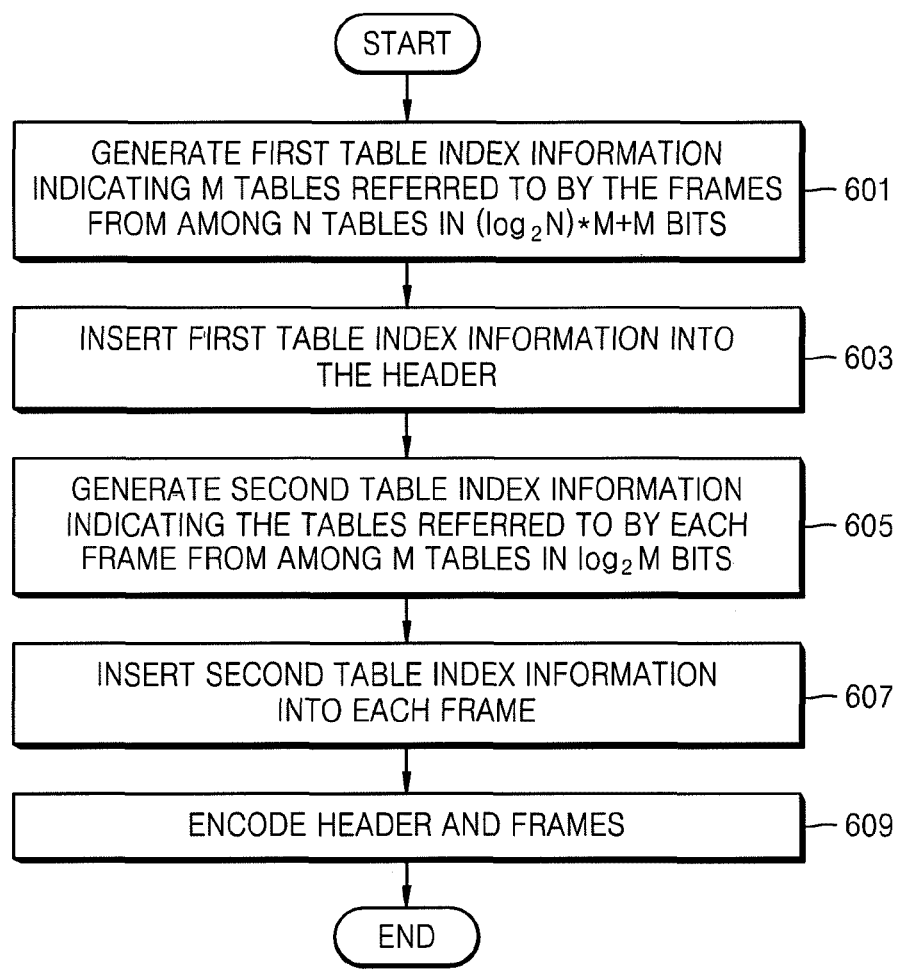
FIG. 6 is a flowchart of a method of encoding a media signal according to an exemplary embodiment of the present invention.

FIG. 6 is a flowchart of a method of encoding a media signal according to an exemplary embodiment of the present invention.

Referring to FIG. 6, the encoding apparatus identifies M tables referred to by the frames from among N tables and generates the first table index information indicating the identified tables by using $(\log_2 N)*M+M$ bits in operation 601. The encoding apparatus inserts the first table index information into the header in operation 603. The encoding apparatus generates the second table index information indicating the tables referred to by each frame from among M tables by using $\log_2 M$ bits in operation 605. When the table referred to by each frame is table L, the second table index information can be generated in $(\log_2 M)*L$ bits. The encoding apparatus inserts the second table index information generated with respect to each frame into each frame in operation 607. The encoding apparatus encodes the header and the frames into which the first and second table index information is inserted in operation 609.

Figure 7:
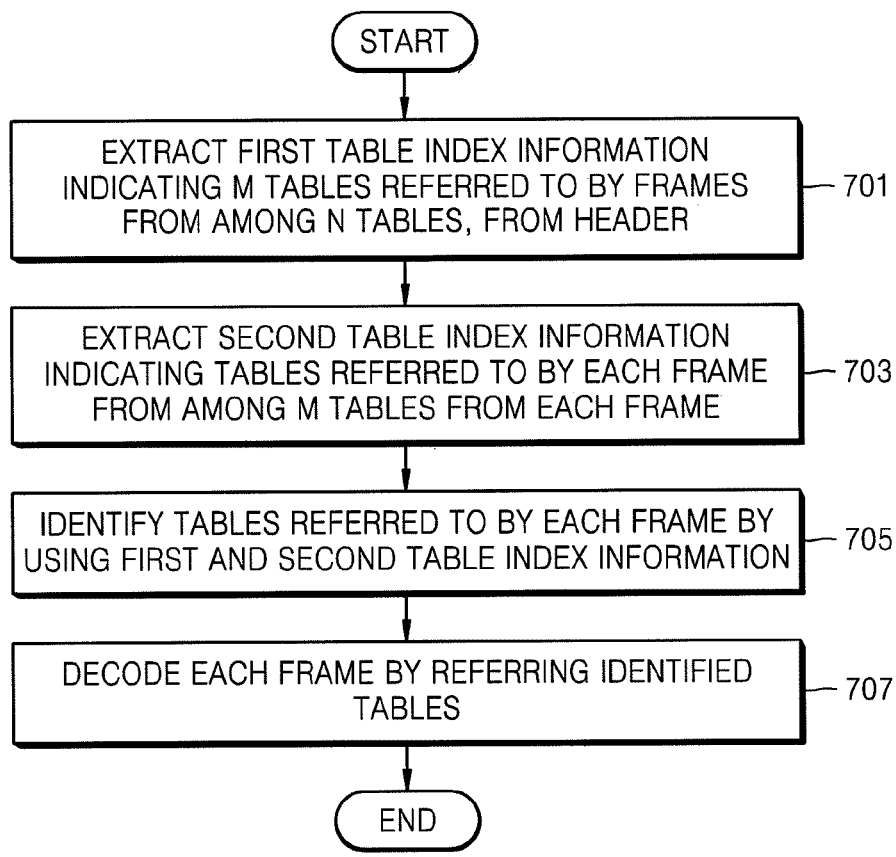
FIG. 7 is a flowchart of a method of decoding a media signal according to an exemplary embodiment of the present invention.

FIG. 7 is a flowchart of a method of decoding a media signal according to an exemplary embodiment of the present invention. Referring to FIG. 7, a decoding apparatus extracts the first table index information indicating M tables referred to by the frames from among N tables, from a header in operation 701. The decoding apparatus can identify the number of table types used in each frame and what the tables are by using the first table index information. The decoding apparatus extracts the second table index information indicating the tables referred to by each frame from among M tables from each frame in operation 703. The decoding apparatus identifies the tables referred to by each frame by using the first and second table index information in operation 705. The decoding apparatus can identify the frequency in which the tables are referred to by the frames, from which the second table index information is extracted, by using the number of table types included in each frame that are identified from the first table index information. The decoding apparatus can extract table identification information that is expressed by using $\log_2 M$ bits from the second table index information. The decoding apparatus refers to the identified data and decodes each frame of the media signal in operation 707.

As described above, in the present invention, the method and apparatus for encoding a media signal, which can improve a transmission rate of a media signal by reducing data needed to designate tables, can be provided.

In addition, the method and apparatus for encoding/decoding a media signal, which can compress/restore a media signal using a small amount of information by reducing data needed to designate tables, can be provided.

While the present invention has been particularly shown and described with reference to an exemplary embodiments thereof, it will be understood by those of ordinary skill in the art that various changes in form and details may be made therein without departing from the spirit and scope of the present invention as defined by the following claims.

What is claimed is:

1. A method of encoding a media signal comprising a header and a plurality of frames, the method comprising:
    generating a first table index information indicating M tables from N tables, the M tables being referred to by the frames for performing an operation from among N tables which are total number of tables which can be referred to by the frames, wherein M and N are natural numbers and M<N;
    inserting the first table index information into the header;
    generating a second table index information indicating tables referred to by each frame from among M tables;
    inserting the second table index information into each of the plurality of frames; and
    encoding the header and the frames.

2. The method of claim 1, wherein the first table index information comprises M.

3. The method of claim 2, wherein the first table index information is expressed in $(\log_2 N)*M+M$ bits.

4. The method of claim 1, wherein the second table index information is expressed as a product of the number of bits for identifying M tables and a frequency in which the tables are referred to by each frame.

5. The method of claim 1, wherein the tables comprise at least one of a table used in entropy coding for data compression, an exponential function table, a log function table, and a trigonometric function table for reducing one of complexity and workload of an operation, a coefficient table for filtering data, Fast Fourier Transform (FFT), Discrete Cosine Transform (DCT), Discrete Fourier Transform (DFT), and Wavelet tables for spatial movement, and SWAP and Direct Memory Access (DMA) for replacing, copying, and moving data.

6. The method of claim 1, wherein the generating of the first table index information further comprises identifying the M and using information relating to the M tables.

7. A method of decoding a media signal comprising a header and a plurality of frames, the method comprising:
    extracting a first table index information from the header, the first table index information indicating M tables from among N tables, the M tables being referred to by the frames for performing an operation from among N tables which are total number of tables which can be referred to by the frames, wherein M and N are natural numbers and M<N;
    extracting a second table index information from each frame, the second table index information indicating tables referred to by each frame from among the M tables;
    identifying the tables referred to by the frames by using the first and second table index information; and
    decoding the frames by referring to the identified tables.

8. The method of claim 7, wherein the first table index information comprises M.

9. The method of claim 8, wherein the first table index information is expressed by using $(\log_2 N)*M+M$ bits.

10. The method of claim 7, wherein the second table index information is expressed as a product of the number of bits for identifying M tables and a frequency in which the tables are referred to by each frame.

11. The method of claim 7, wherein the tables comprise at least one of a table used in entropy coding for data compression, an exponential function table, a log function table, and a trigonometric function table for reducing one of complexity and workload of an operation, a coefficient table for filtering data, Fast Fourier Transform (FFT), Discrete Cosine Transform (DCT), Discrete Fourier Transform (DFT), and Wavelet tables for spatial movement, and SWAP and Direct Memory Access (DMA) for replacing, copying, and moving data.

12. An apparatus for encoding a media signal comprising a header and a plurality of frames, the apparatus comprising:
    a first table index information generator which generates first table index information indicating M tables from N tables, the M tables being referred to by the frames for performing an operation from among N tables which are total number of tables which can be referred to by the frames, wherein M and N are natural numbers and M<N;
    a second table index information generator which generates second table index information indicating tables referred to by each frame from among the M tables; and
    a table index information inserter which inserts the first table index information into the header and the second table index information into each of the plurality of frames.

13. The apparatus of claim 12, wherein the first table index information comprises M.

14. The apparatus of claim 13, wherein the first table index information is expressed in $(\log_2 N)*M+M$ bits.

15. The apparatus of claim 12, wherein the second table index information is expressed as a product of the number of bits for identifying M tables and a frequency in which the tables are referred to by each frame.

16. The apparatus of claim 12, further comprising an encoder which encodes the header and the frames.

17. The apparatus of claim 12, wherein the tables comprise at least one of a table used in entropy coding for data compression, an exponential function table, a log function table, and a trigonometric function table for reducing one of complexity and workload of an operation, a coefficient table for filtering data, Fast Fourier Transform (FFT), Discrete Cosine Transform (DCT), Discrete Fourier Transform (DFT), and Wavelet tables for spatial movement, and SWAP and Direct Memory Access (DMA) for replacing, copying, and moving data.

18. An apparatus for decoding a media signal comprising a header and a plurality of frames, the apparatus comprising:
a first table index information extractor which extracts first table index information from the header, the first table index information indicating M tables from N tables, the M tables being referred to by the frames for performing an operation from among N tables which are total number of tables which can be referred to by the frames, wherein M and N are natural numbers and M<N;
a second table index information extractor which extracts second table index information from each frame, the second table index information indicating tables referred to by each frame from among the M tables;
a table identifier which identifies the tables referred to by the tables by using the first and second table index information; and
a decoder which decodes the frames by referring to the identified tables.

19. The apparatus of claim 18, wherein the first table index information comprises M.

20. The apparatus of claim 19, wherein the first table index information is expressed by using $(\log_2 N)*M+M$ bits.

21. The apparatus of claim 18, wherein the second table index information is expressed as a product of the number of bits for identifying M tables and a frequency in which the tables are referred to by each frame.

22. The apparatus of claim 18, wherein the tables comprise at least one of a table used in entropy coding for data compression, an exponential function table, a log function table, and a trigonometric function table for reducing one of complexity and workload of an operation, a coefficient table for filtering data, Fast Fourier Transform (FFT), Discrete Cosine Transform (DCT), Discrete Fourier Transform (DFT), and Wavelet tables for spatial movement, and SWAP and Direct Memory Access (DMA) for replacing, copying, and moving data.

* * * * *